(12) United States Patent
Unger (10) Patent No.: US 8,094,037 B2
(45) Date of Patent: Jan. 10, 2012

(54) METHOD AND APPARATUS FOR IDENTIFYING AN ELECTRONIC APPLIANCE

(75) Inventor: Robert A. Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 844 days.

(21) Appl. No.: 11/694,818

(22) Filed: Mar. 30, 2007

(65) Prior Publication Data

US 2008/0238653 A1    Oct. 2, 2008

(51) Int. Cl.
*G08B 21/00* (2006.01)
*G06F 15/173* (2006.01)
*G06Q 99/00* (2006.01)

(52) U.S. Cl. ............... 340/686.1; 340/687; 709/223; 709/224; 705/317; 705/318

(58) Field of Classification Search .......... 340/686.1, 340/687; 709/223, 224; 705/317, 318
See application file for complete search history.

(56) References Cited

U.S. PATENT DOCUMENTS

| | | | | |
|---|---|---|---|---|
| 5,910,776 | A * | 6/1999 | Black | 340/10.1 |
| 6,160,796 | A | 12/2000 | Zou | |
| 6,244,758 | B1 * | 6/2001 | Solymar et al. | 709/224 |
| 6,965,935 | B2 * | 11/2005 | Diong | 709/224 |
| 7,489,924 | B2 * | 2/2009 | Choi | 455/420 |
| 2003/0038730 | A1 * | 2/2003 | Imafuku et al. | 340/825.24 |
| 2003/0048380 | A1 | 3/2003 | Tamura | |
| 2003/0121032 | A1 * | 6/2003 | Cho et al. | 717/173 |
| 2003/0167411 | A1 * | 9/2003 | Maekawa | 713/201 |
| 2004/0031058 | A1 * | 2/2004 | Reisman | 725/112 |
| 2004/0261126 | A1 | 12/2004 | Addington | |
| 2005/0009498 | A1 * | 1/2005 | Ho et al. | 455/402 |
| 2005/0033699 | A1 * | 2/2005 | Umeo et al. | 705/56 |
| 2005/0044404 | A1 * | 2/2005 | Bhansali et al. | 713/200 |
| 2005/0071280 | A1 * | 3/2005 | Irwin et al. | 705/59 |
| 2005/0159823 | A1 | 7/2005 | Hayes | |
| 2006/0010078 | A1 * | 1/2006 | Rezvani et al. | 705/66 |
| 2006/0031094 | A1 * | 2/2006 | Cohen et al. | 705/2 |
| 2008/0019276 | A1 * | 1/2008 | Takatsuji et al. | 370/236 |
| 2008/0195857 | A1 * | 8/2008 | Douillet | 713/150 |

FOREIGN PATENT DOCUMENTS

| | | |
|---|---|---|
| EP | 1557738 A2 | 7/2007 |
| GB | 2403105 A1 | 12/2004 |
| JP | 06217222 A2 | 8/1994 |
| JP | 2002152702 A2 | 5/2002 |

* cited by examiner

*Primary Examiner* — Jennifer Mehmood
*Assistant Examiner* — Andrew Bee
(74) *Attorney, Agent, or Firm* — Fitch, Even, Tabin & Flannery (57) ABSTRACT

Methods and systems for identifying an appliance comprising receiving indication of an appliance coupling to a communication port on a communication network and retrieving, over the communication network, a first identification assigned to the appliance during manufacturing of the appliance. The appliance is validated using the first identification and a status of the appliance is determined.

19 Claims, 6 Drawing Sheets

| Appliance ID | Hardware Rev. | Software Rev. | Location | Owner | Contact Info. |
|---|---|---|---|---|---|
| ID1 | | | | | |
| ID2 | | | | | |
| | | | | | |

FIG. 6

METHOD AND APPARATUS FOR IDENTIFYING AN ELECTRONIC APPLIANCE

BACKGROUND OF THE INVENTION

1. Field of the Invention

The present invention relates generally to automated reporting of identification information of an appliance.

2. Discussion of the Related Art

Consumer electronics manufacturers typically provide warranty cards to a purchaser of an electronic appliance, intending to use the information gathered, at least in part, to aid in identifying the electronic appliance. The warranty card typically comes pre-coded with the manufacture, model type and a serial number that was assigned to the appliance and affixed to the chassis or other structure of the appliance during production. The additional contact information provided by the purchaser on the warranty card may be used to locate the appropriate owner for example in the case of safety recalls, determining if a product is a black market good and/or a grey market good, (e.g., a product illegally manufactured and/or illegally imported from another country) and in the rare case of locating the true owner of an electronic device that was reported stolen and is later recovered.

However, consumers tend to forget and/or decline to fill out and send in the warranty the card, in part, because there is not much benefit for them in returning the warranty card, and returning the card is also not usually required in order to receive benefits under the warranty. Thus, current methods of reporting the serial number assigned to the electronic appliance and identifying such appliances are minimally effective.

SUMMARY OF THE INVENTION

Several embodiments of the invention advantageously address the needs above as well as other needs by providing systems, methods and apparatus for identifying an appliance comprising receiving indication of an appliance coupling to a appliance comprising receiving indication of an appliance coupling to a communication port on a communication network, retrieving, over the communication network, a first identification assigned to the appliance during manufacturing, validating the appliance using the first identification, and determining a status of the appliance.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Many of the functional units described in this specification have been labeled, for example, as modules, appliances, devices, servers, databases, connectors, ports and/or interfaces in order to more particularly emphasize their implementation independence. For example, an interface may be implemented as a hardware circuit comprising microprocessors or microcontrollers, custom VLSI circuits or gate arrays, off-the-shelf semiconductors such as logic chips, transistors, or other discrete components. Additionally or alternatively, such modules, interfaces, appliances, devices, etc. may also be implemented in programmable hardware devices such as field programmable gate arrays, programmable array logic, programmable logic devices or the like. Interfaces may also be implemented in software and/or firmware for execution by various types of processors or integrated circuits.

Software and/or firmware, for instance, may comprise one or more physical or logical blocks of computer instructions that may, for instance, be organized as an object, procedure, or function used to control the electronic circuits comprising the above descried modules, appliances, etc. Nevertheless, the executables of an identified software and/or firmware module need not be physically located together, but may comprise disparate instructions stored in different locations which, when joined logically together, comprise the module and achieve the stated purpose for the module.

A module of executable code could be a single instruction, or many instructions, and may even be distributed over several different code segments, among different programs, and across several memory devices. Similarly, databases and/or operational data may be identified and illustrated herein within modules, and may be embodied in any suitable form and organized within any suitable type of data structure. The database data and/or operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "of the present embodiment," and similar language throughout this specification may, but do not necessarily, all refer to the same embodiment.

Furthermore, the described features, structures, or characteristics of the invention may be combined in any suitable manner in one or more embodiments. In the following description, numerous implementations are described, such as examples of user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention sets forth an apparatus, system and method for identifying an appliance. In some variations of the present embodiment, the appliance is any type of electronic consumer entertainment appliance that comprises a communication interface configured to provide access to identification data stored on the appliance.

By way of example, the electronic appliance may be a video player and/or recorder, a music player and/or recorder, a set top box, a cable box, a satellite receiver and/or transmitter, a video game console, a personal computer, and/or a television. The communication interface and access to the identification data may be via wire or wireless technology.

Figure 1:
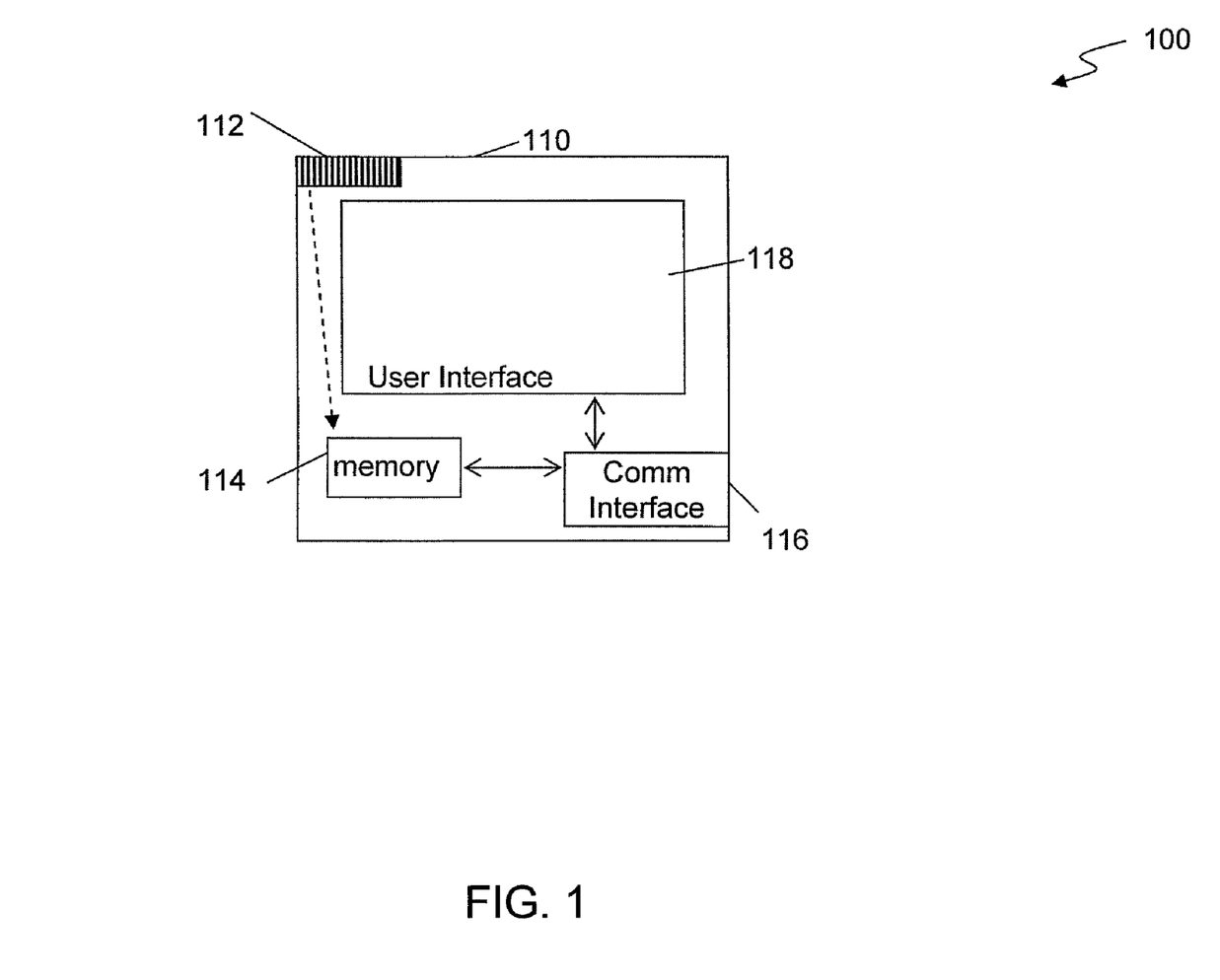
FIG. 1 is a block diagram of an embodiment for identifying an appliance.

Referring first to FIG. 1, there is illustrated a block diagram of an embodiment for identifying an appliance. In some variations of the present embodiment, the appliance 110 is an electronic appliance that comprises an identification 112, a memory module 114, a communication interface 116, and in some variations of the present embodiment, the appliance 110 also comprises a user interface 118. The memory module 114 and the user interface 118 are coupled to the communication interface 116.

The identification 112 is an identification assigned to the appliance 110 as is typically done for electronic appliances manufactured or produced in bulk. For example, in order to keep track of the mass produced appliances, the identification 112 is assigned to the appliance 110 during production and/or manufacturing. This identification 112 is, in some embodiments, a series of numbers and/or letters and/or may comprise a bar code. The identification 112 is typically long enough to avoid duplicating the identification 112 for another appliance of the same type and manufacturer, and maybe unique.

In some embodiments, the identification 112 may be a serial number and may be affixed to, etched on or otherwise printed and/or represented on the chassis and/or housing portion of the appliance. The identification 112 may be represented either on the inside or outside, and/or may be represented on a device, circuit board and/or structure within the chassis or housing. The identification 112 may be intended to permanently remain with the appliance 110 for the entire lifetime of the appliance 110.

The identification 112 may also comprise a bar code that is adapted to be scanned by a machine for quick reading. In some embodiments, the identification 112 is affixed to the external portion of the appliance 110, and is therefore, modifiable without opening, harming or destroying the appliance 110. This may be advantageous when the identification 112 is read by a person and/or an optical device reader, because it may be done without having to open the appliance 110 or disturb any electronic and/or mechanical functioning pieces of the appliance 110.

In some variations of the present embodiment, the identification 112 is assigned to the appliance 110 during production and/or manufacturing and is electronically stored on the circuitry within the appliance 110, either instead of or in addition to being represented on the chassis and/or housing. In some variations, the identification 112 is both represented on the appliance 110 (e.g., on the outside and/or inside) and electronically stored in the appliance 110, for example, in the memory module 114. In some variations, the memory module 114 may be configured to transmit the identification 112 having been stored over a radio frequency (RF) signal, e.g., by using radio frequency identification (RFID) technology.

The memory module 114 may be configured with the identification 112 during the manufacturing process, on the production line and/or prior to selling the appliance 110 to a consumer. In some embodiments, the identification 112 is affixed to the appliance 110 chassis and is later read by a machine in order to upload the identification 112 to the memory module 114. In other embodiments, the identification 112 is assigned and stored on the memory module 114 during production; and, is then electronically retrieved from the memory module 114 in order to affix the identification 112 to the appliance 110 chassis or any structure within the appliance 110, either externally or internally.

In some variations of the present embodiment, when a customer purchases the appliance 110, the customer may register with the manufacturer or re-seller as the owner of the appliance 110. The owner may register with the manufacturer by providing, for example, personal information stored by the manufacturer in connection with the identification 112 of the appliance 110. By way of example, a new owner may provide registration information by filling out and sending in a paper warranty card provided with the appliance 110. In other instances, the owner's registration information may be provided electronically, for example, on-line via a website and/or e-mail. In some variations of the present embodiment, the appliance 110 may be used to transmit owner registration information, for example, to the manufacturer. This may be done using the user interface 118 described in further detail below.

The appliance 110 may be configured to transmit owner registration information when coupled, via the communication interface 116, to a communication port providing access to a communication network (discussed in further detail below). In some variations of the present embodiment, the identification 112 stored on the memory module 114 may also be transmitted to the manufacturer via the communication network 116 of the appliance 110. By way of example, the communication interface 116 is coupled to the memory module 114, and the memory module 114, for example, is electronically accessed via the communication interface 116 to be transmitted over the communication network.

In some variations of the present embodiment, the communication interface 116 comprises a microprocessor configured to access the memory module 114 and retrieve a copy of the identification 112. The communication interface 116 may also comprise a transmitter and/or a transceiver, coupled to the microprocessor, configured to transmit, over the communication network, the identification 112 having been retrieved. The communication interface 116 may comprise a transceiver adapted, for example, transferring data to a networked electronic device (e.g., a server and/or database) via a serial port, parallel port, Universal Serial Bus (USB), Ethernet, cable modem, telephone, Digital Subscriber Line (DSL), WiFi, 802.11x, satellite, paging, cellular, radio frequency, infra red, blue tooth, etc.

In some variations, the communication interface 116 is configured to communicate with a service provider (e.g., a server and/or database), wherein the identification 112 may be used by the service provider to validate the appliance 110. In some variations of the present embodiment, the service provider may validate the appliance 110 as a service to the owner and/or manufacturer of the appliance 110.

Referring again to the user interface 118; in some variations of the present embodiment, the user interface 118 is any type of interface configured to receive input from a user and/or display output to a user. Although the user interface 118 is not necessary in an embodiment for identifying the appliance 110, in some variations, the appliance 110 comprises a user interface 118 that may be coupled to the communication interface 116.

By way of example, the appliance 110 may comprise a television set, and the user interface 118 may comprise a television screen and/or an alpha/numeric input device configured to communicate with the television set, e.g., a remote control, a keyboard, mouse, etc. In some variations of the present embodiment, the user interface 118 is configured to receive registration information from an owner, and transfer the registration information to the communication interface 116. For example, the owner may enter a name, telephone number and/or home/e-mail address; and the communication interface 116 is configured to transmit the owner registration information over the communication network. This information may be transmitted to, for example, a database for storage in connection with the identification 112 of the appliance 110.

Figure 2:
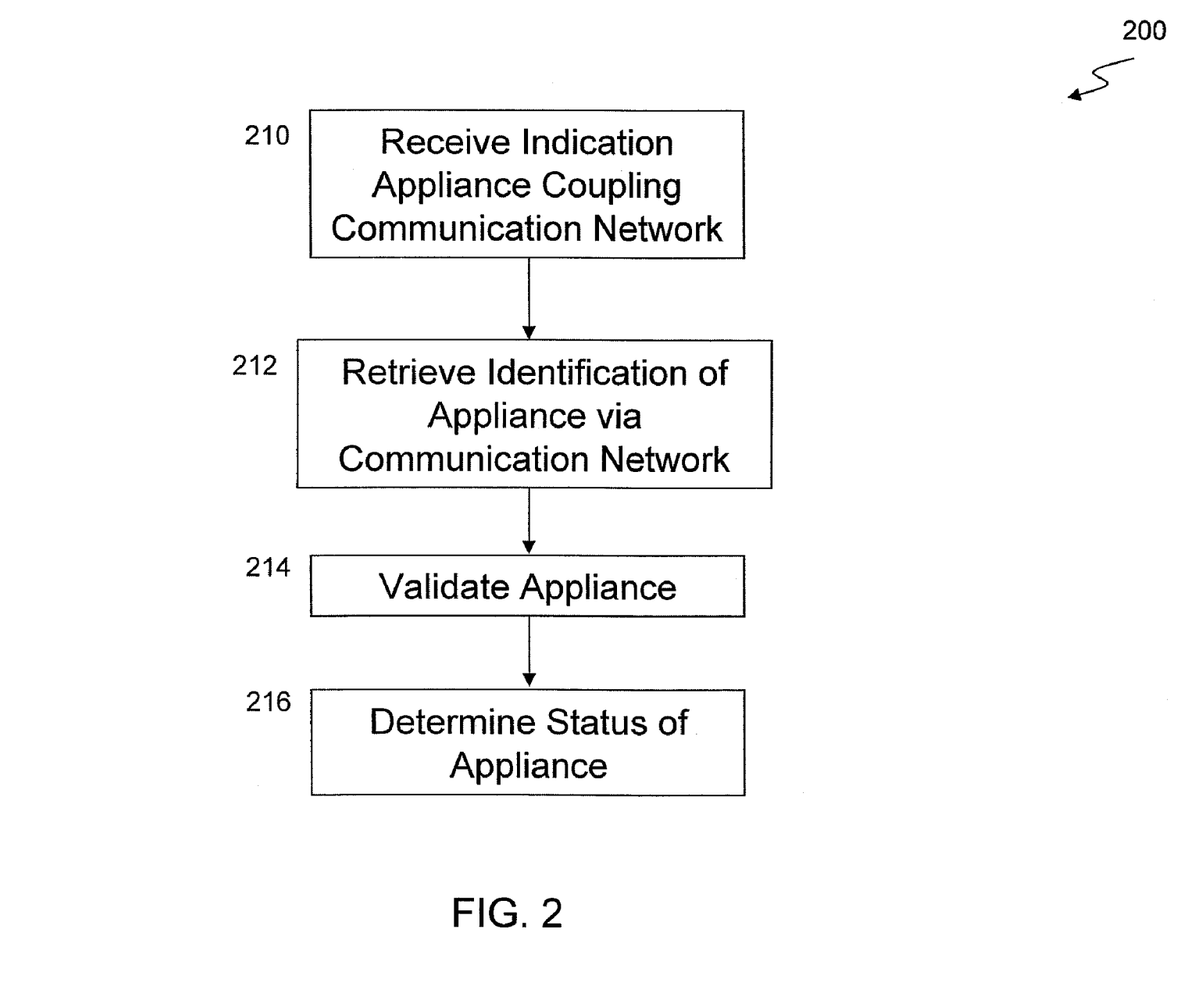
FIG. 2 is a flow diagram of an embodiment for use in identifying an appliance.

Referring next to FIG. 2, depicted is a flow diagram of an embodiment for use in identifying an appliance. By way of example, a customer purchases an appliance 110 (shown in FIG. 1) and brings the appliance 110 home to install. As described above in reference to FIG. 1, the communication interface 116 of the appliance 110 is configured to couple to a communication port, and this installation may include coupling the appliance 110 to a communication port providing access to a communication network. Furthermore, the communication interface 116 may be configured to transmit a coupling indication and/or a notification, over the communication network. Thus, beginning at step 210, an indication that the appliance is coupling to a communication network is received when the customer installs the newly purchased appliance.

In some variations, the communication interface 116 may then request validation from a service provider and/or receives a request from a service provider to validate the appliance 110. Validation may include validating the identification 112 of the appliance that was assigned and electronically stored on the appliance prior to selling the appliance to the customer. Thus, next in step 212, the identification 112 of the appliance 110 is retrieved via the communication network. By way of example, upon request, or automatically, the communication interface 116 may access the memory module 114 in order to retrieve an electronic copy of the identification 112 being stored on the appliance 110. The communication interface 116 may then be configured to transmit the identification 112 to the service provider over the communication network.

Next, in step 214, the appliance is validated, for example, by using the identification 112 having been retrieved. In some embodiments, the validation comprises accessing a database (e.g., database 320 shown in FIG. 3 described in further detail below) comprising a list of valid manufacturer assigned identifications, e.g., valid serial numbers. The identification 112 may be compared to those listed in the database.

Next, in step 216, the status of the appliance 110 is determined. In some variations of the present embodiment, the determining the status comprises accessing a database comprising a registration status of the appliance 110. By way of example, the database may store registration information received after the appliance was purchased (e.g., information regarding the purchaser of the appliance 110 provided when a warrantee card was filled out and sent in). Accordingly, the registration information may be stored in the database in connection with, and corresponding to, the identification 112 of the purchased appliance 110.

In some variations in the present embodiment, the status of the appliance 110 is determined by accessing the database and searching for registration information corresponding to the identification 112 having been retrieved. By way of example, the appliance 110 may be determined to be unregistered when no registration information exists and/or the database contains an unregistered status for the identification 112. Accordingly, determining the status of the appliance 110 may further include registering the appliance 110 having been determined unregistered. By way of example, the identification 112 of the appliance 110 and any corresponding owner registration information may be transmitted to and stored in the database.

Figure 3:
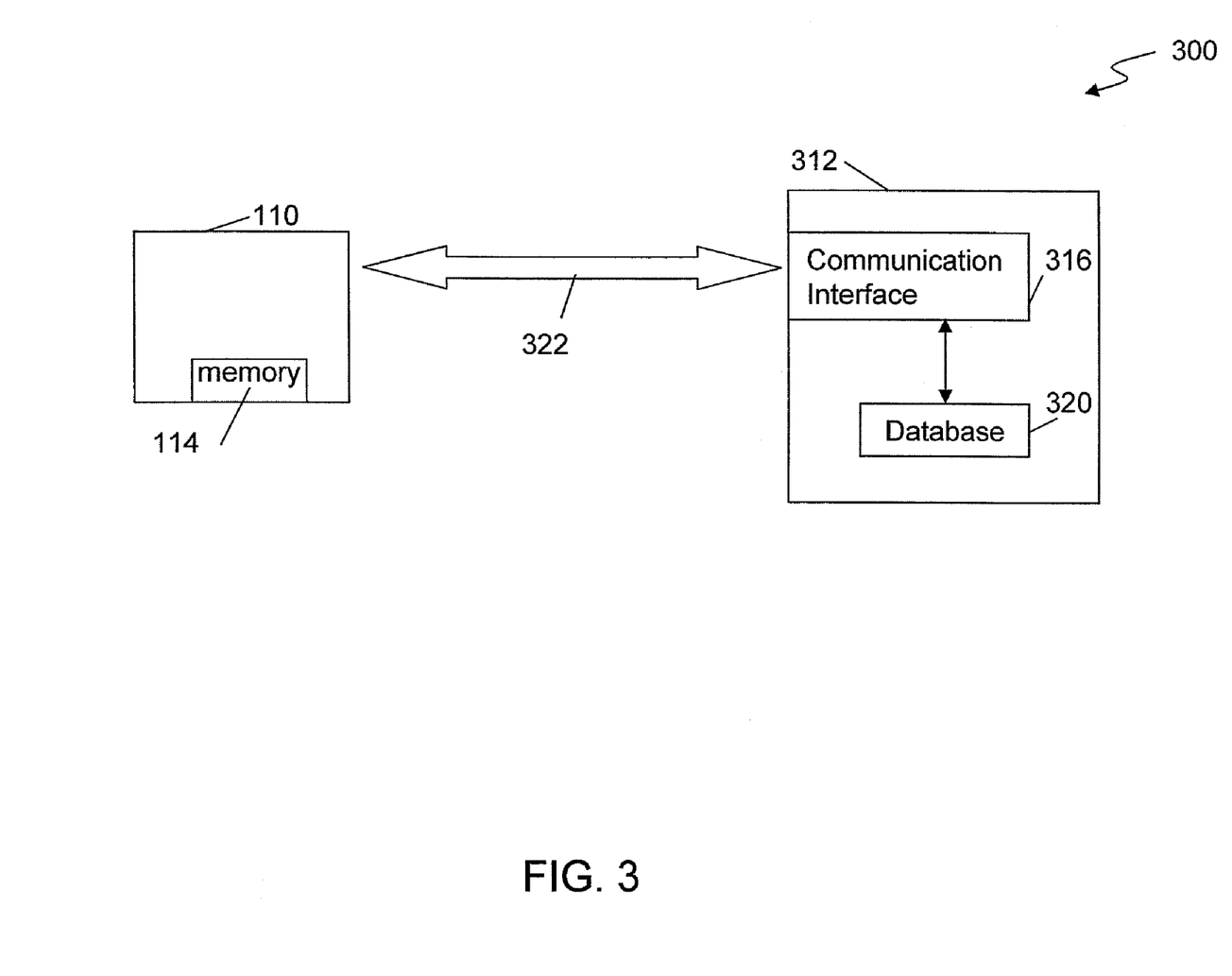
FIG. 3 is a block diagram of another embodiment for identifying an appliance.

Next referring to FIG. 3, depicted is another embodiment for identifying an appliance. The system 300 comprises an appliance 110, an identifying device 312 and a communication network 322.

The appliance 110, comprising a memory module 114, is configured to couple to the communication network 322. The identifying device 312 and the appliance 110 are coupled together via the communication network 322. The identifying device 312 comprises a communication interface 316 and a database 320. The database 320 is coupled to communication interface 316 and may be accessed by and/or communicate with the communication interface 316. In some embodiments, the identifying device 312 may be a networked electronic device, e.g., a computer and/or server, or a compilation of computers and/or servers. In some variations of the present embodiment, the communication network 322 comprises a wire and/or wireless, local and/or wide area network, providing broadband, cable, satellite and/or telephonic services, and in some variations comprises the Internet. The identifying device 312 may be implemented by a company and/or service provider configured to identify and/or track electronic appliances for manufacturers and/or consumers of the electronic appliance.

In some variations of the present embodiment, the appliance 110 is assigned an identification during production, wherein the identification is uploaded to and stored on the memory module 114 within the appliance 110. In some variations of the present embodiment, the memory module 114 may comprise a non-volatile memory device and, for example, wherein, once the memory module 114 has been written, the only way to modify the identification requires a re-writing of the portion of memory in which the identification is stored. Accordingly, in some embodiments, this type of non-volatile memory may be used in order to protect the identification from being modified by placing other necessary firmware/software data on the memory module. Wherein, a re-writing of the memory module would cause the appliance to stop functioning, and accordingly, would prevent an unauthorized person from attempting such a modification.

In other variations, the identification may additionally and/or alternatively be stored in the memory module 114 by use of hardware and/or a laser etched matrix, for example, such that it is configured to be read and electrically transmitted over the communication network 322 by the appliance 110, while remaining un-modifiable.

Accordingly, the identifying device 312 is configured to receive, via the communication interface 316 the identification from the appliance 110. Wherein, the identifying device 312 is configured to use the identification to validate the appliance 110. By way of example, the communication interface 316 receives an indication that the appliance 110 is coupling to the communication network 322. In some variations, the identifying device 110, via the communication interface 116, requests that the appliance 110 transmit it's identification. Once received, the communication interface 316 may transmit the identification to the database 320 and/or access the database 320 for validating the appliance.

By way of example, the database 320 comprises valid manufacturer assigned appliance identifications, and wherein, the database 320 is configured to be accessed by the communication interface 316 for comparing the received identification to the list of valid identifications. In some embodiments, the database 320 may further store information corresponding to the appliance 110 and the purchaser of the appliance 110. Such information stored the database 320 may comprise registration, geographical and other demographic information.

The identifying device 312 may also be configured to receive, over the communication network 322, registration information of the purchaser/owner of the appliance 110, and store the registration information and corresponding identification in the database 320. Thereafter, in some variations, the identifying device 312 may further be configured to receive, via the communication interface 316, an attribute of the appliance 110 including, for example, geographic, software/hardware specification and/or or diagnostic information. Accordingly, the information received from the appliance 110 and/or owner may be stored on the database 320. Additionally, the identifying device 312 may use the registration information having been stored on the database 320 to determine the status of the appliance 110.

By way of example, the identifying device 312 is used to determine the status of the appliance 110 by accessing the database 320 that comprises a list of valid appliance identifications and the registration status of each appliance. Accordingly, the identifying device 312 retrieves the identification of the appliance 110, and reviews the database to determine the registration status of the appliance corresponding to the identification. The identifying device 312 may determine that the retrieved identification has no corresponding registration information stored in the database 320, and thus, determine that the appliance 110 is "unregistered".

Accordingly, in some variations, the identifying device 312 is configured to register the "unregistered" appliance 110. By way of example, the identifying device 312 may request, via the appliance 110, that the customer register the appliance 110 and enter owner registration information. Therein, the appliance 110 transmits the owner registration information to the identifying device 312 via the communication interface 316. The communication interface 316 may then transfer the registration information to the database 320 for storage along with the corresponding identification and a "registered" status.

Figure 4:
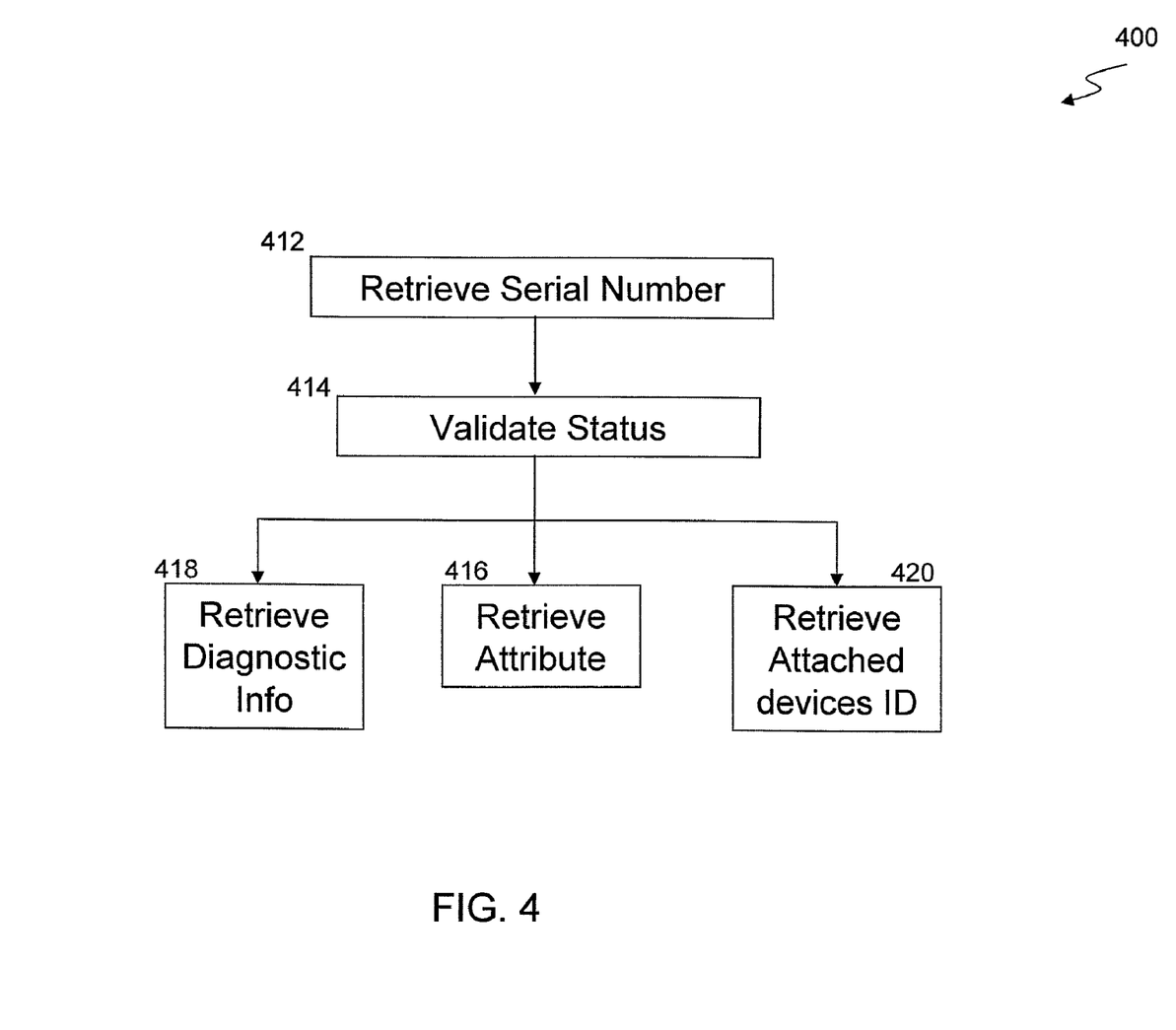
FIG. 4 is a flow diagram of another embodiment for use in identifying an appliance.

Next referring to FIG. 4, depicted is another embodiment for use in identifying an appliance. Also referring to FIG. 3, wherein the system 300 detects when an appliance 110 is coupled to the communication network 322, beginning in step 412, the identifying device 312 retrieves the identification and/or serial number over the communication network 322. Next, in step 414, the appliance 110 is validated, and the status of the appliance 110 is determined. In some embodiments, determining the status of the appliance 110 may comprise determining other attributes of the appliance.

Accordingly, a plurality of attributes such as software/hardware specifications comprising a current revision level of the hardware, software and/or firmware of the appliance 110 may be retrieved by the identifying device 312. In step 416, one or more attributes, such as the software and/or firmware revision levels, is retrieved over the communication network 322. For example, the software/hardware revision levels may be use in order to determine if the revision levels are current/up-to-date and/or require an update. In some variations of the present embodiment, the system 300 sends updated software and firmware to the appliance 110 over the communication network 322, whereby the identifying device 312 may also use the identifications to track which appliances have successfully updated.

Additionally or alternatively, in step 418, diagnostic information of the appliance 110 is retrieved by the identifying device 312, and/or transmitted by the appliance 110, over the communication network 322. By way of example, if the appliance 110 is not functioning properly, the retrieved diagnostic information may aid in repairing the appliance 110. In some variations, the appliance 110 is configured to self-diagnose an issue, defect and/or malfunction of the appliance 110. Once self-diagnosed the issue may be translated into a code.

Accordingly, the appliance 110 may be further configured to transmit, over the communication network 322, the code relating to an issue that requires repair or maintenance. Thereafter, using the communication network 322, the repair may be accomplished remotely, saving the owner of the appliance 110 the hassle of bringing the appliance 110 to a repair shop.

In some variations of the present embodiment, in step 420, information is retrieved corresponding to other appliances related to and attached to the appliance 110 and/or the same communication port. By way of example, the system 300 in FIG. 3 may retrieve a first identification from a first appliance, and then retrieve a second identification of a related second appliance that is connected to the first appliance (not shown in FIG. 3).

Figure 5:
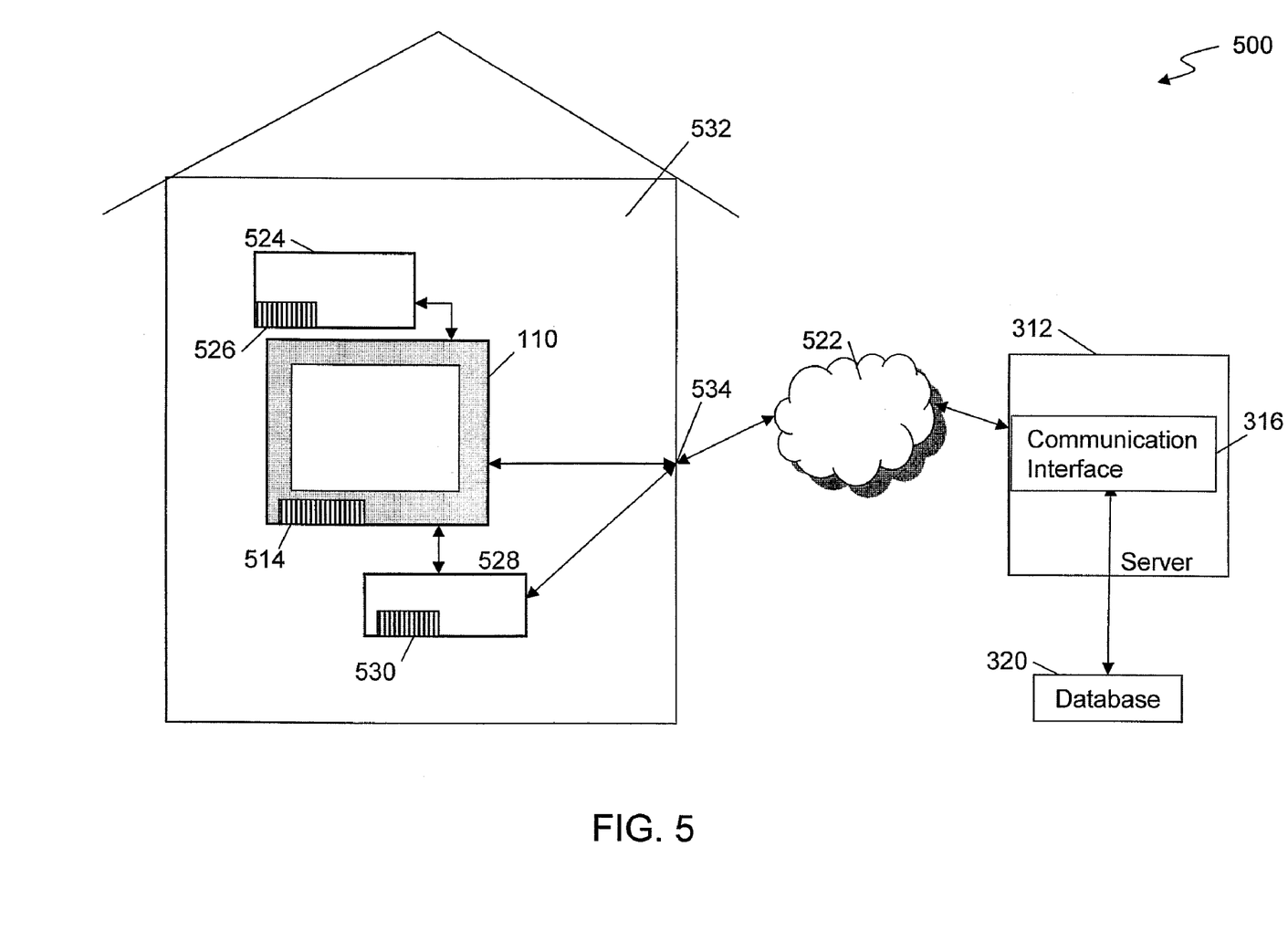
FIG. 5 is a block diagram of another embodiment for identifying an appliance.

Referring next to FIG. 5, depicted is another embodiment for identifying an appliance. System 500 of FIG. 5 comprises a first appliance 110, an identifying device 312, a communication network 522, a second appliance 524 and a third appliance 528. The first appliance 110 comprises a first serial number 514, the second appliance comprises a second serial number 526, and the third appliance 528 comprises a third serial number 530. The identifying device 312 comprises a communication interface 316 and is in communication with a database 320.

In some embodiments, the first appliance 110 is stationed within a home 532, and is coupled to a communication port 534 within the home 532. Wherein, the communication port 534 provides communication services to the home 532. Accordingly, through the communication port 534, the first appliance 110 is in communication with the identifying device 312 via the communication network 522. The first appliance 110 is coupled to the second appliance 524 and the third appliance 528. And, in some embodiments, the third appliance 528 is also coupled to the communication port 534. The identifying device 312 may comprise a server, for example, and the database 320 may be configured to be remote from the identifying device 312 or configured on the server of the identifying device 312.

In some variations of the present embodiment, the identifying device 312 is used in identifying a plurality of attached and/or related appliances, such as, the first appliance 110, the second appliance 524 and/or the third appliance 528. In some embodiments, the identifying device 312 is deployed by a manufacturer of consumer appliances, or, for example, is deployed by a third party providing identifying and/or tracking services on behalf of the consumer and/or the manufacturer.

In some embodiments, one or more of the appliances is configured to couple to the communication port 534 in order to bring in an entertainment service inside the home 532. For example, in some embodiments, the communication network 522 is a cable broadcast service network and the first appliance 110 is a television adapted to receive the cable service. In yet other embodiments, the communication network 522 provides access to the Internet and the first appliance 110 may be configured as a personal computer, a point of decision television (POD TV) or an Internet protocol television (IPTV), and/or any kind of adapter box configured to stream the internet into, for example, a traditional television, entertainment system, etc.

In some embodiments, the identifying device 312 is further configured to track the location of appliances. The identifying device 312 may determine a first location of the communication port to which the first appliance 110 is initially coupled, e.g., the physical address of the home 523. This location may then be stored as the first location in the database 320 corresponding to the first appliance 110. By way of example, identifying device 312 may be configured to determine a new location of a new communication port to which the first appliance 110 is subsequently coupled. Accordingly, the identifying device 312 may compare the first location to the new location for any changes. This may be used in order to track the location of the appliance.

By way of example, a consumer purchases the first appliance 110. The consumer brings the first appliance 110 home 532 and couples the first appliance 110 to the communication port 534. In some embodiments, the identifying device 312 is configured to validate and/or identify the first appliance 110 by retrieving an identification (e.g., the first serial number 514) of the first appliance 110 over the communication network 522. The identifying device 312 may also be configured to determine the status of the first appliance 110 using the first serial number 514 and information previously stored in the database 320.

In some variations of the present embodiment, the retrieval of the first serial number 514 of the first appliance 110 may be done automatically when the receiving the indication that the appliance has coupled to the communication network 522, either initially and/or subsequently. In other embodiments, the identification may be periodically and/or dynamically retrieved upon instruction. By way of example, the service provider providing the tracking and identifying service may programmatically request the identification of all appliances on the communication network 522 every day, week, month, etc. In some variations of the present embodiment, the service provider may be looking for a specific appliance or type of appliance, and thus, dynamically request the identification of specific appliances on the communication network 522.

In some embodiments, the identifying device 312 is configured to determine the first serial number 514 of the first appliance 110 is unregistered, and provides an interface for the user to register the first appliance 110 and corresponding first serial number 514. During the registration of the first appliance 110, in some embodiments, the identifying device 312 may retrieve and/or request information and attributes about the first appliance 110 and/or the purchaser, and store the information within the database 320. An example of an embodiment of the information stored in the database 320 is shown in FIG. 6.

By way of example, determining the status of the first appliance 110 may comprise retrieving a current location of the communication port 534 to which the first appliance 110 is coupled. Accordingly, this location may be compared to the originally registered location stored in the database 320. In some variations, determining the status may comprise determining that the appliance has been stolen; and, may further comprise determining, over the communication network, the new location of the appliance having been stolen.

In some variations of the present embodiment, determining the status may comprise accessing a database comprising reported stolen appliance identifications. Accordingly, the identification having been retrieved may be compared to the list of reported stolen appliances. Thus, the validation and determination of the status of the first appliance 110 may be a verification that the first appliance 110 has been properly purchased, and is not illegal and/or an infringing copy of a valid appliance, e.g., it is not a black market or gray market good. And furthermore, in some variations, determining the status of the appliance may be a method of tracking the appliance and/or locating stolen goods.

Figure 6:
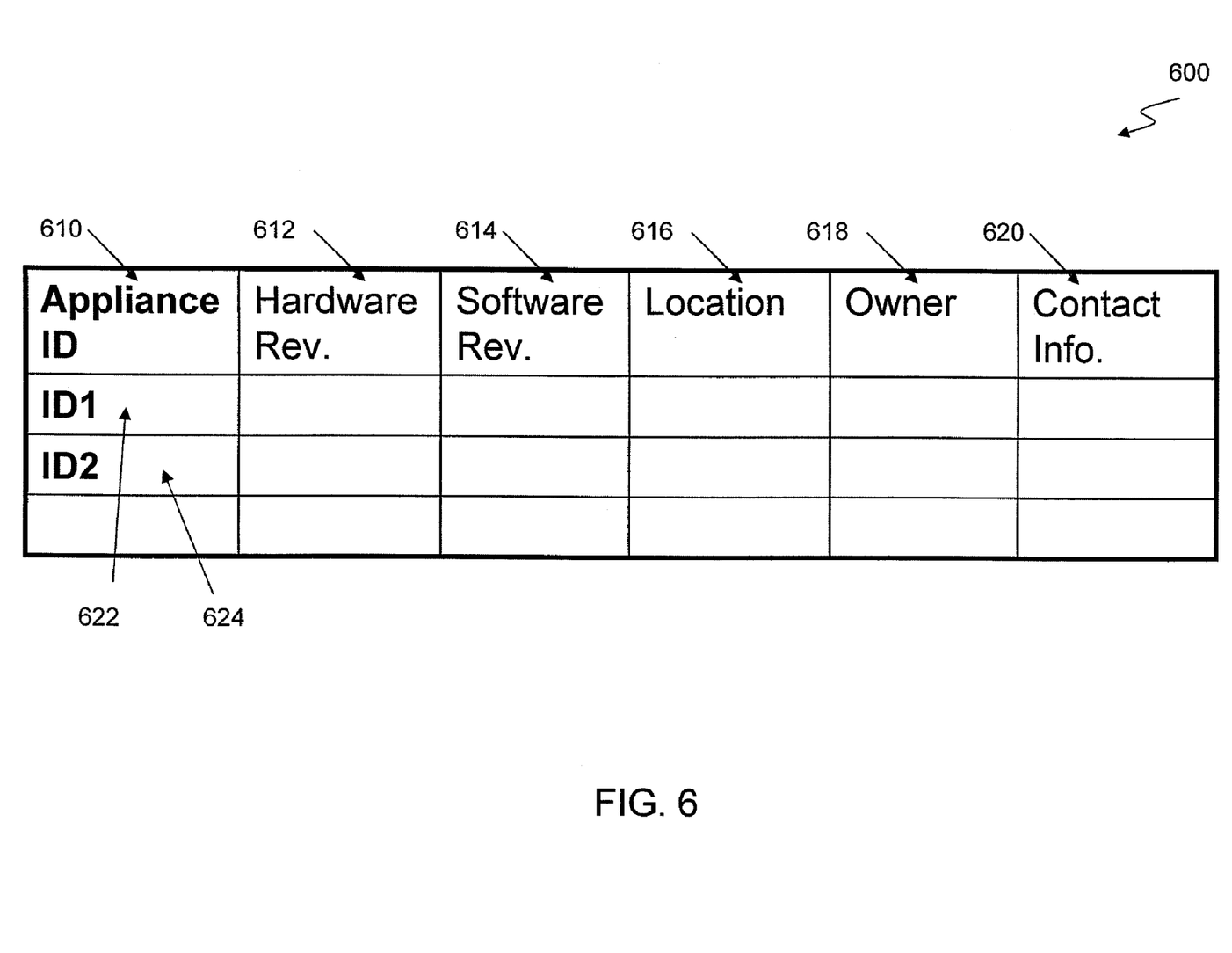
FIG. 6 is an example of a database for use in identifying an appliance.

Referring now to FIG. 6, depicted is an embodiment of information and attributes of one or more appliances stored in a database for identifying an appliance. FIG. 6 depicts a database table 600 comprising the following columns: an appliance identification (ID) 610, an appliance hardware revision number 612, an appliance software revision number 614, an appliance location 616, an appliance owner name 618, and contact information 620 for retrieval and/or diagnostics of the appliance.

Referring to both FIGS. 4 and 5, in some embodiments, the identifying device 312 communicates over the communication network 522 with the first appliance 110 to retrieve the first serial number 514. After the first serial number 514 is retrieved, the identifying device 312 stores the first serial number 514 in the database table 600. For example, the first serial number 514 is stored in the appliance ID 610 column in cell ID1 622. Next, in some variations of the present embodiment, the identifying device 312 may retrieve attributes such as the hardware and software revision numbers of the first appliance 110, and may store the revision numbers in the ID1 row and hardware revision 612 column and the software revision 614 column respectively.

In some embodiments, the purchaser of the first appliance 110 may provide additional registration information such as a designated location for using the first appliance 110. For example, if the purchaser is planning on bringing the first appliance 110 home 532 to use, the purchaser may provide the address of the home 532. Additionally, in some embodiments, the purchaser may provide his name and contact information during the registration process. Accordingly, the registration information of the first appliance 110 may be stored in the database table 600 in the row for ID1 622 and corresponding columns, such as, the location 616, the appliance owner name 618 and the contact information 620, respectively.

In some embodiments, the identifying device 312 may be configured to retrieve an identification of one or more related appliances coupled to the first appliance 110. By way of example, the second appliance 524 may be coupled to the first appliance 110 via an external connector 536, e.g., a USB connection, audio/visual cables, Ethernet, etc. The second appliance 524, or another related appliance, may comprise at least one of a set top box, a television, a cable box, a video player, a video recorder, a music player, a music recorder, a video game console and a personal computer. In some variations of the present embodiment, the third appliance 528 is in communication with the first appliance 110 via wireless communication, e.g., Bluetooth, radio frequency, infrared, etc.

Accordingly, the identifying device 312 may retrieve the second serial number 526 of the second appliance 524 by instructing the first appliance 110 to retrieve the second serial number 526. The first appliance 110 may retrieve the second serial number 526 via the USB connection and transmit it to the identifying device 312 over the communication network 522. Thus, through the connection of the first appliance 110, the identifying device 312 is capable of retrieving and storing the second serial number 526 in the appliance ID 610 column under ID2 624. Similarly, the attributes of the second appliance 524 may be retrieved in order to populate the appropriate columns of the database table 600 in the row for ID2 624. In some embodiments, the third appliance 528 and the third serial number 530 may be retrieved either directly and/or, for example, wirelessly via the first appliance. The third serial number 530 is then similarly transmitted and stored with corresponding attributes to the database 320 on the identifying device 312. Thus, in some variations of the present embodiment, the first appliance 110, the second appliance 524 and the third appliance 528 are configured to communicate with at least one of the identifying device 312 and another appliance through the communication port 534.

In some embodiments, the identifying device is able to determine the physical location of the first appliance 110 by determining the physical location of the communication port 534 of which the first appliance 110 is coupled. In some embodiments, when the first appliance 110 couples to the communication port 534, it automatically sends an indication to the identifying device 312 that it has coupled to the communication network 522. After receiving this indication, the identifying device 312 may retrieve the first serial number 514 and the physical location of the communication port 534 in the home 532. In some variations of the present embodiment, the identifying device 312 will compare the location of the home 532 to the address stored in the location 616 column of the database table 600.

Additionally, the identifying device 312 retrieves the identification and other attributes of the first appliance 110 periodically. Therefore, retrieving such attributes, including a current location of the first appliance 110, allows the identifying device 312 to identify and/or track the first appliance 110, including identifying attributes such as location, revisions, updates and/or other demographic information of the owner. Therefore, as long as the appliance is coupled to a communication interface 522, no matter the location, the system 500 is configured to track the first appliance 110 over its lifetime. By way of example, identifying device 312 may track movement of the first appliance 110 around the country, determine how long it has been in service and other issues involved in deciding whether or not to provide current hardware, software and/or firmware updates. Furthermore, in some embodiments, the identifying device 312 capturing the serial numbers and information for related or connected appliances is able to better determine the advantages of upgrading and/or updating software, firmware and/or hardware components in the appliances considering the given topology and usage within the home 532.

In some variations of the present embodiment, the identifying device 312 tracks the first appliance by comparing the first serial number 514 to a list of serial numbers of stolen appliances. If the first serial number 514 is on the list of stolen appliances, then the identifying device 312 is configured to determine that the first appliance 110 has been previously reported stolen and has been put back into service at a new location. Accordingly, for example, an alert may be sent to the registered purchaser when it is determined that the first appliance 110 is no longer at the registered location, for example, or may send the new operating location to the registered owner.

The identifying device 312 may be further configured to contact proper authorities when the first appliance 110 is determined to be stolen. Furthermore, the identifying device 312 to let the proper authorities know where to locate the stolen first appliance 110. This system and method of identifying the appliance at least provides a more expeditious and successful way of locating stolen consumer appliances as compared to depending on a repair shop to visually validate that the serial number is not on a list of stolen appliances.

While the invention herein disclosed has been described by means of specific embodiments and applications thereof, numerous modifications and variations could be made thereto by those skilled in the art without departing from the scope of the invention set forth in the claims.

What is claimed is:

1. A method of identifying an appliance comprising:
receiving indication of an appliance coupling to a communication port on a communication network;
issuing, over the communication network and to a plurality of appliances accessible over the communication network, a request that identification information from a specific type of appliance be returned over the communication network;
retrieving, over the communication network and in response to the request, a first identification assigned to the appliance during manufacturing of the appliance;
validating the appliance using the first identification, wherein the validating comprises comparing the first identification having been retrieved to a database comprising valid manufacturer assigned serial numbers; and
determining a status of the appliance when the appliance has been validated, wherein determining the status of the appliance comprises accessing a database comprising a registration status of the appliance corresponding to the first identification, and determining whether the appliance is unregistered; and
registering the appliance when it is determined that the appliance is unregistered.

2. The method of claim 1, wherein the determining the status further comprises accessing a database comprising reported stolen appliance identifications.

3. The method of claim 1, wherein the determining the status further comprising:
determining, over the communication network, a current location of the communication port to which the appliance is coupled;
accessing a database comprising a registered location of the appliance corresponding to the first identification having been retrieved; and
comparing the current location to the registered location.

4. The method of claim 1, wherein the determining the status further comprises:
determining, over the communication network, an attribute of the appliance comprising a revision level of at least one of hardware, software and firmware.

5. The method of claim 1, further comprising:
retrieving, over the communication network, diagnostic information of the appliance.

6. The method of claim 1, further comprising:
instructing, via the communication network, the appliance to identify one or more related appliances connected to the appliance;
retrieving, over the communication network and through the appliance in response to the instruction to identify one or more related appliances, a second identification of a related appliance connected to the appliance.

7. An apparatus comprising:
a communication interface coupled to a communication network;
a database coupled to the communication interface;

the communication interface configured to issue, over the communication network and to a plurality of appliances accessible over the communication network, a request that identification information from a specific type of appliance be returned over the communication network;

the communication interface configured to receive, over the communication network, an identification from an appliance coupled to a communication port on the communication network, wherein the identification is assigned to the appliance by a manufacturer and stored on the appliance during manufacturing;

the database further comprising valid manufacturer assigned appliance identifications, and the database further configured to be accessed for validating the appliance by comparing the received identification of the appliance to the valid manufacturing assigned appliance identifications;

the database further comprising a registration status of the appliance, and further configured to be accessed for determining the registration status of the appliance; and the apparatus being configured to determine the registration status of the appliance when it is determined that the appliance has been validated and further configured to register the appliance when it is determined that the appliance is unregistered.

8. The apparatus of claim 7, wherein the communication interface is further configured to receive registration information from an owner of the appliance and transmit the registration information and the identification corresponding the appliance to the database for storage.

9. The apparatus of claim 7, wherein the communication interface is further configured to determine, over the communication network, the location of the communication port to which the appliance is coupled.

10. The apparatus of claim 7, further configured to track the location of the appliance comprising:
the communication interface determining a first location of the communication port to which the appliance is initially coupled and storing the first location in the database; and
the communication interface determining a new location of a new communication port to which the appliance is subsequently coupled.

11. The apparatus of claim 7, wherein the communication interface is further configured to retrieve a current revision level of at least one of the hardware, software and firmware of the appliance, and wherein the communication interface is configured to use the current revision level to determine if the appliance needs an update.

12. An electronic appliance comprising:
a memory module;
an identification assigned by a manufacturer to the electronic appliance and stored on the memory module during manufacturing;
a communication interface coupled to the memory module, the communication interface configured to couple to a communication port on a communication network;
the communication interface configured to transmit, over the communication network, the identification in response to receiving a request, issued over the communication network and to a plurality of appliances accessible over the communication network, requesting that identification information from a specific type of appliance be returned over the communication network; and
wherein the identification is used to validate the electronic appliance, wherein the validating comprises comparing the identification to a database comprising valid manufacturer assigned serial numbers; and
wherein the identification is further used to determine a registration status of the appliance when the appliance has been validated and to register the appliance when it is determined that the appliance is unregistered.

13. The electronic appliance of claim 12, further comprising:
a user interface coupled to the communication interface;
the user interface configured to receive registration information from an owner, wherein the communication interface is configured to transmit the registration information over the communication network to a database for storage in connection with the identification of the electronic appliance.

14. The electronic appliance of claim 12, wherein a physical location of the communication port, to which the electronic appliance is coupled, is registered with a service provider of the communication network.

15. The electronic appliance of claim 12, wherein the server is further configured to track the appliance as a service to the owner of the appliance.

16. The electronic appliance of claim 12, further comprising:
an external connector coupled to the communication interface;
the external connector configured to couple to a related appliance, and wherein the communication interface is further configured to transmit, over the communication network, an identification of the related appliance.

17. The electronic appliance of claim 16, wherein the related appliance is at least one of a set top box, a television, a cable box, a video player, a video recorder, a music player, a music recorder, a video game console and a personal computer.

18. The method of claim 6, further comprising:
where the retrieving the first identification comprises obtaining, from the remote appliance and from over the communication network, the identification of the appliance and a serial number of the appliance;
obtaining attributes of the appliance, where the attributes comprising current hardware revision, software revisions, and firmware revisions of the appliance;
obtaining code from the appliance over the communication network, the code defining self diagnostic information from the appliance identifying a malfunction of the appliance;
determining one or more advantages of upgrading the appliance based on the self diagnostic information, the topology and usage;
determining whether to upgrade the appliance based on the determined one or more advantages;
identifying, through the appliance, two or more additional appliances attached to the appliance, wherein the retrieving the second identification comprises instructing the appliance to retrieve a second serial number of the related appliance connected to the appliance from related appliance connected to the appliance; and
maintaining a database corresponding a device identification for a plurality of appliances comprising the appliance, further associating the device identifications for each of the plurality of appliances with a corresponding hardware revision, an appliance software revision, an appliance location, an appliance owner name and contact information.

19. The method of claim 18, wherein the determining the status further comprising:

determining, over the communication network, a current location of the communication port to which the appliance is coupled;

accessing the database comprising a registered location of the appliance corresponding to the first identification having been retrieved;

comparing the current location to the registered location; and recording in the database reported stolen appliance identifications.

* * * * *